Jan. 17, 1967 W. F. STROUD 3,298,683
PAPER-JOGGING APPARATUS
Filed Nov. 25, 1964 6 Sheets-Sheet 2

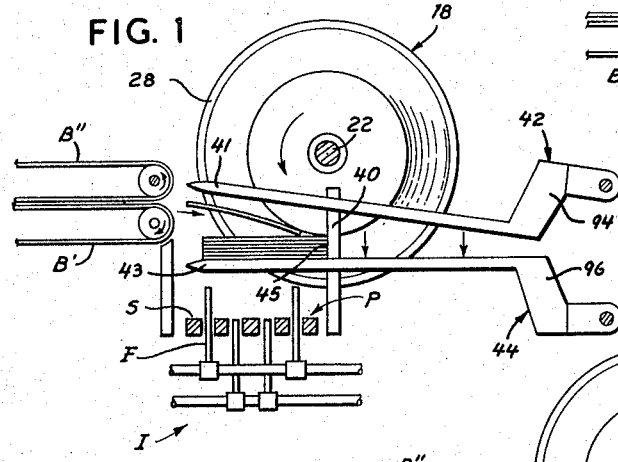
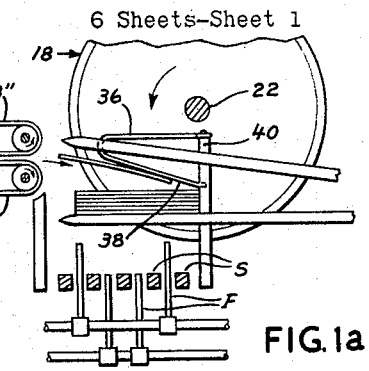
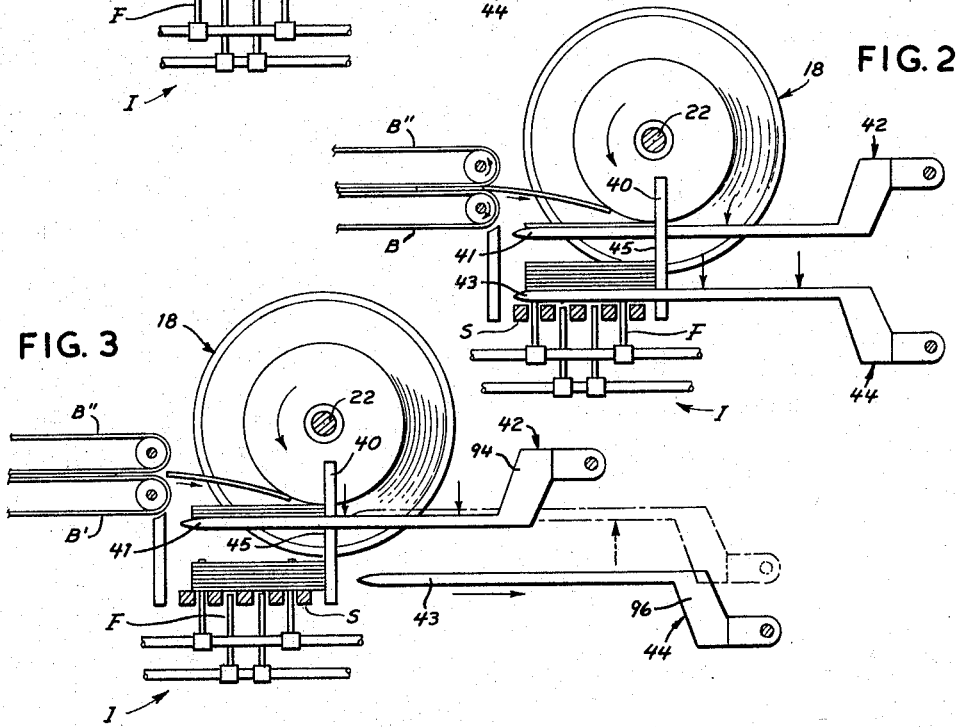
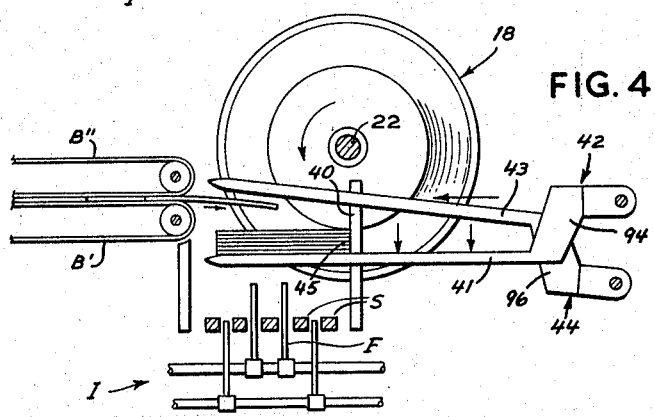

INVENTOR.
WILLIAM F. STROUD
BY *Frederick C. Bromley*
ATTORNEY

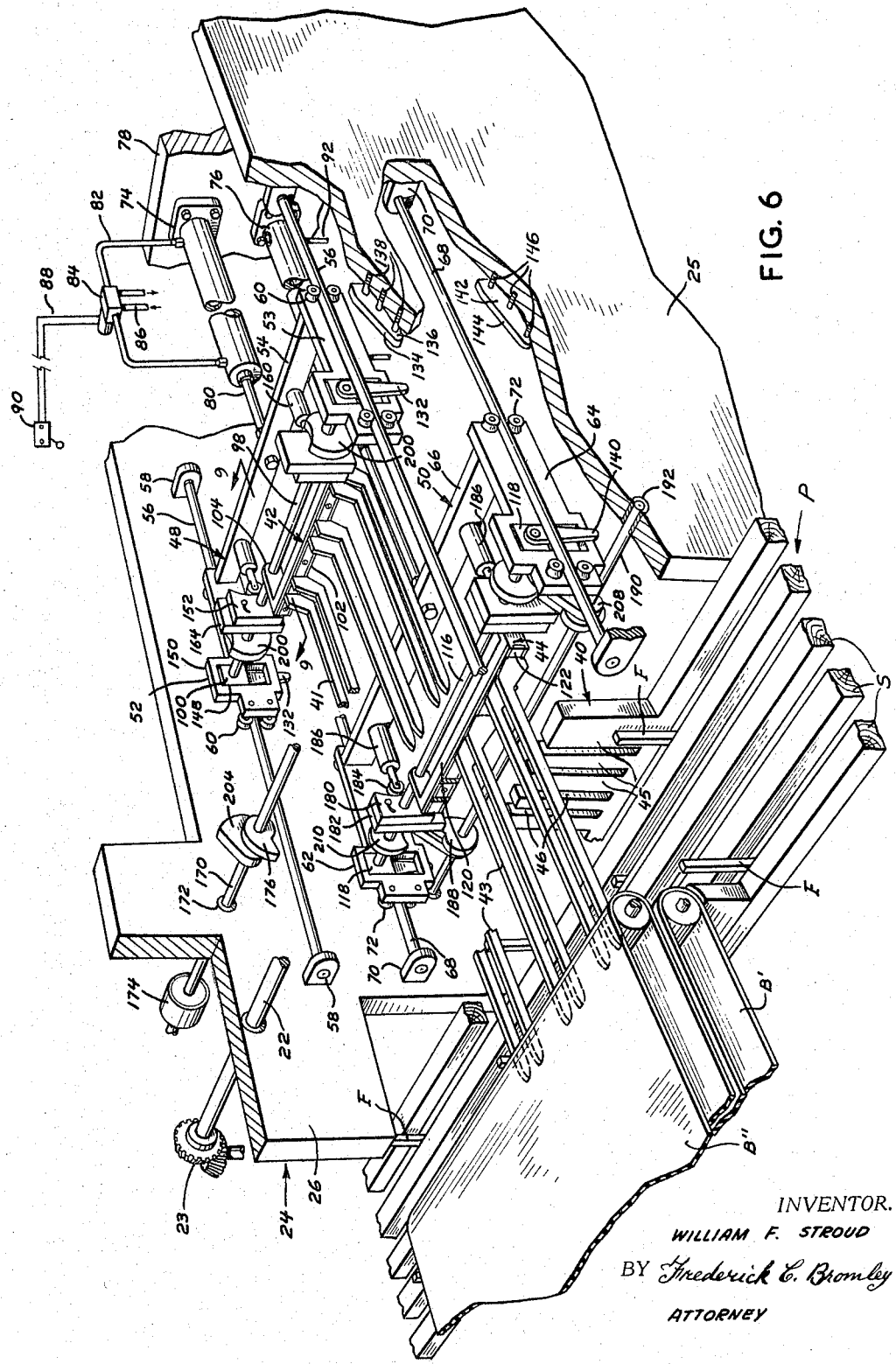

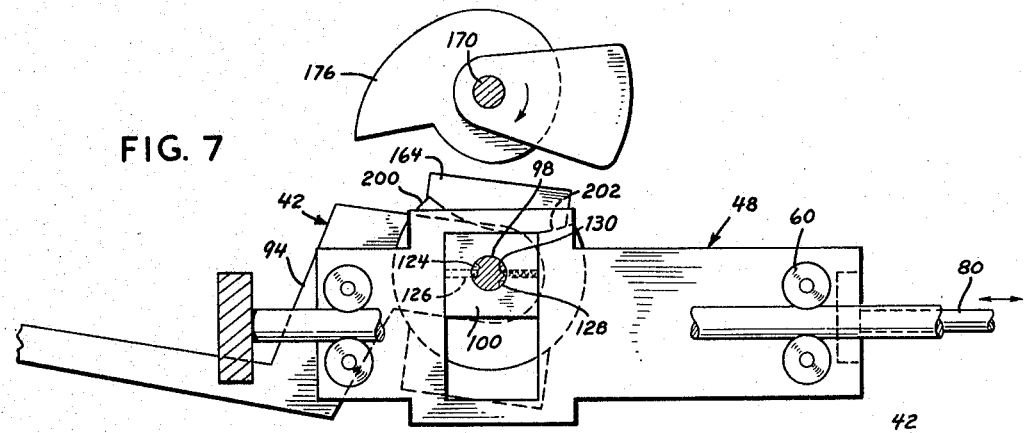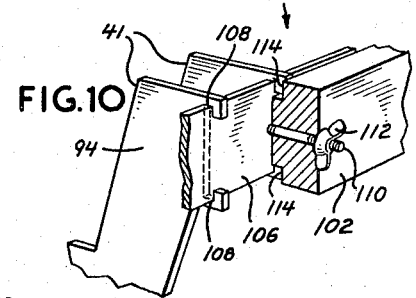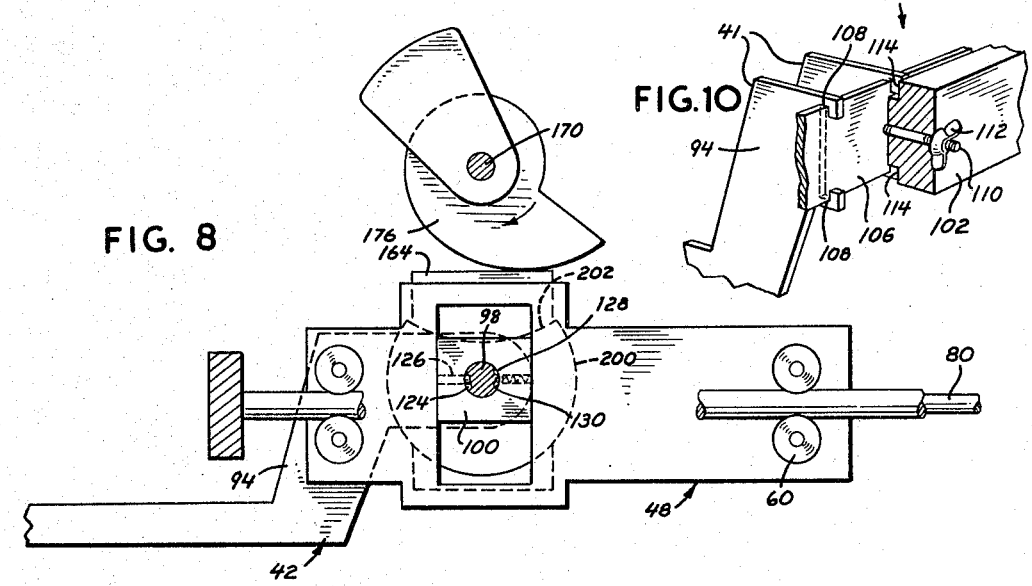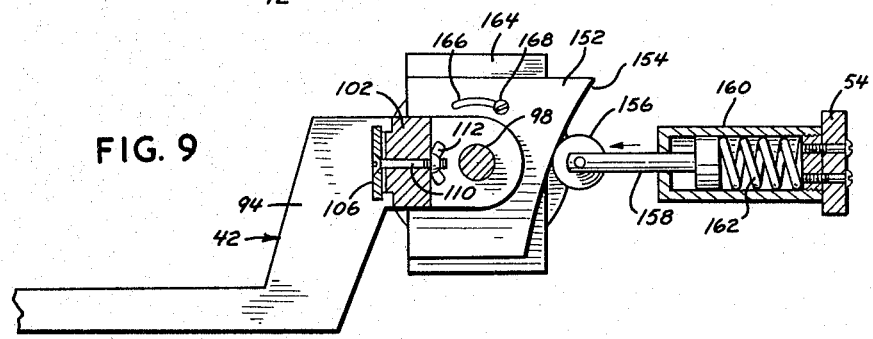

Jan. 17, 1967    W. F. STROUD    3,298,683
PAPER-JOGGING APPARATUS
Filed Nov. 25, 1964    6 Sheets-Sheet 5

INVENTOR.
WILLIAM F. STROUD
BY Frederick C. Bromley
ATTORNEY

Jan. 17, 1967   W. F. STROUD   3,298,683
PAPER-JOGGING APPARATUS
Filed Nov. 25, 1964   6 Sheets-Sheet 6

INVENTOR.
WILLIAM F. STROUD
BY Frederick C. Bromley
ATTORNEY

United States Patent Office 3,298,683
Patented Jan. 17, 1967

3,298,683
PAPER-JOGGING APPARATUS
William F. Stroud, McKellar, Ontario, Canada
Filed Nov. 25, 1964, Ser. No. 413,760
37 Claims. (Cl. 271—59)

My invention relates to paper-jogging apparatus and has for its paramount object to provide an improved jogger mechanism by which paper sheets may be jogged with rapidity and precision. Ordinary joggers are usually either of the vibrating type or the box type in which the sides and end of the box move in and out in synchronization with the sheets as they are delivered by the press or folder.

As is well known in the art, the vibrating manual type of jogger is often used to finish piles of sheets after their removal from the printing press, even though the press is equipped with a box-type jogger. This is because a box-type jogger cannot be relied upon to align or jog the sheets to the degree of accuracy required. The sides and end of the box-type jogger in their in-and-out movements have a propensity to shuffle the sheets against one another which results in the wet ink smearing and causing off-set on certain kinds of paper. Moreover, the sheets sometimes adhere to the moving sides of the jogger for one reason or another, one cause of which is static electricity. As a consequence, a pile of jogged sheets will have some sheets which are not aligned.

I have determined by experimentation that the disadvantages referred to above can be eliminated by the provision of a jogger structure comprising a pair of comparatively large discs rotated rapidly about a common axis while sheets are fed to them in a manner in which the discs co-act to receive the sheets successively at their downwardly moving sides whereby the sheets are caught individually between the discs and carried downwardly and forwardly against an abutment. In this way the sheets are deposited one upon another in stacked formation with a high degree of accuracy which makes for a decided and desirable improvement in jogging effect, and with the advantage that the jogging may be carried out at high speed without adversely affecting the jogging thereof. A jogger of this kind is highly advantageous in that its output is capable of keeping pace with the output of a press which is run at high speed.

The space between confronting faces of the spaced discs should conform exactly, or perhaps a minute amount less, than the width of the sheets to be jogged. The jogger may be associated with the delivery system of the press in an arrangement such that in a sequential delivery of sheets they are received individually between confronting faces of adjoining discs and carried downwardly and forwardly below the axis of rotation thereof. The sheets are brought to a halt against a stop device and deposited in a neat and accurate pile. The spacing of the discs can be readily achieved as by mounting them on a shaft and they may be spacedly adjusted from time to time to conform with different sized sheets delivered by the press. The discs may be used in multiples to accommodate a plurality of rows of sheets delivered concurrently by a press, but the space between adjacent discs must conform to the width of the sheets.

Hence, it is a highly important object of my invention to provide a jogger mechanism incorporating co-axial revolving discs spaced to receive sheets to be jogged and arranged to catch the sheets with a forward and downward sweep whereby to forward the sheets against a subjacent stop surface where they are arrested and deposited in stack formation with a high degree of jogged alignment. A further object is to provide in a jogger of this kind means to preclude the sheets from billowing or humping up as they are acted on by the discs. A still further object of the invention is to provide a jogger of the kind described, intermediate wheels or like means between adjacent discs of a substantially less diameter whereby to obviate the said billowing or humping up of the sheets.

A still further object of my invention is to provide a jogger apparatus of the kind referred to in which a fork receives the sheets as they are jogged and lowers them onto a platform for subsequent removal or displacement so that stacks may be similarly deposited on the platform one after another. In this way sequential operation may take place whereby a continuity of stacks each containing a predetermined number of sheets may be deposited onto the platform as they are received from the delivery system of the press. The fork is devised to gradually lower a stack of jogged sheets so that the uppermost sheet of the stack is maintained at a constant level regardless of the building up of sheets in the stack.

A still further object of my invention is to provide in a jogger apparatus of this kind an arrangement of forks in which a lower fork is raised above a platform to receive jogged sheets in forming a stack of sheets of a predetermined number, and is lowered when the stock is built up thereon to deposit the stack on the platform and is then caused to withdraw for a subsequent operational cycle. The said arrangement of forks also includes an upper fork which is lowered to receive sheets as they are jogged to form a fresh stack containing a given number of sheets whereupon the upper fork is caused to be lowered to deposit the stack on said platform and thereafter is withdrawn. According to this arrangement the lower and upper forks alternately co-act to continuously deposit jogged stacks onto the platform, each stack containing a given number of sheets which is required, for instance, in the manufacture of books, in which the sheets are book pages and the stacks form sections of a book which are assembled with covers to provide a completed book.

A still further object of the invention is to provide a novel and serviceable actuating mechanism for the automatic operation of the forks in timed sequence.

With these primary objects in view my invention consists in the novel construction and arrangement of an automatic jogger as set forth in the ensuing specification and shown in the accompanying drawings forming a part thereof, it being understood that the disclosure is a selected form of the invention and that changes and modifications may be resorted to as fairly come within the spirit of the invention.

In the drawings my invention is exemplified in an automatic jogging apparatus designed to be associated with the delivery mechanism of a continuous printing press whereby to provide for automatic manufacture of books, etc.

In the drawings:

FIG. 1 is a schematic view showing how collated book pages are jogged as they are received from the delivery system of a belt press and stacked onto a lower fork which lowers the stack onto a subjacent platform when the stack is built up to contain a given number of sheets;

FIG. 1a is a similar diagrammatic view showing a slight modification in that the skeleton wheels are replaced by fixed guides;

FIG. 2 is a similar view to FIG. 1 but showing how the upper fork is lowered to receive jogged book pages in the forming of a stack after the lower fork has been lowered to deposit a stack onto the platform;

FIG. 3 is a further schematic view showing how the lower fork is withdrawn to deposit the stack of pages onto the platform;

FIG. 4 is a further schematic view showing the upper fork advanced and tilted ready to take the place of the lower fork after the latter has received a complement of jogged book pages and is being lowered to deposit the stack onto the platform;

FIG. 6 is a general perspective view of the jogging apparatus with parts broken away for clarity, and shown associated with the delivery belts of a press;

FIG. 7 is a fragmentary end elevation of the upper fork assembly in its forward position beneath the actuating cam mechanism and with the fork tilted;

FIG. 8 is a similar view to FIG. 7 but showing how the upper fork is lowered by the cam mechanism;

FIG. 9 is a detail section taken substantially on line 9—9 of FIG. 6 showing the tensioning device for the upper fork to allow it to gradually descend as a stack of jogged book pages are built up thereon;

FIG. 10 is a perspective fragmentary detail of the adjustable mounting of the fork blades;

Figure 5:
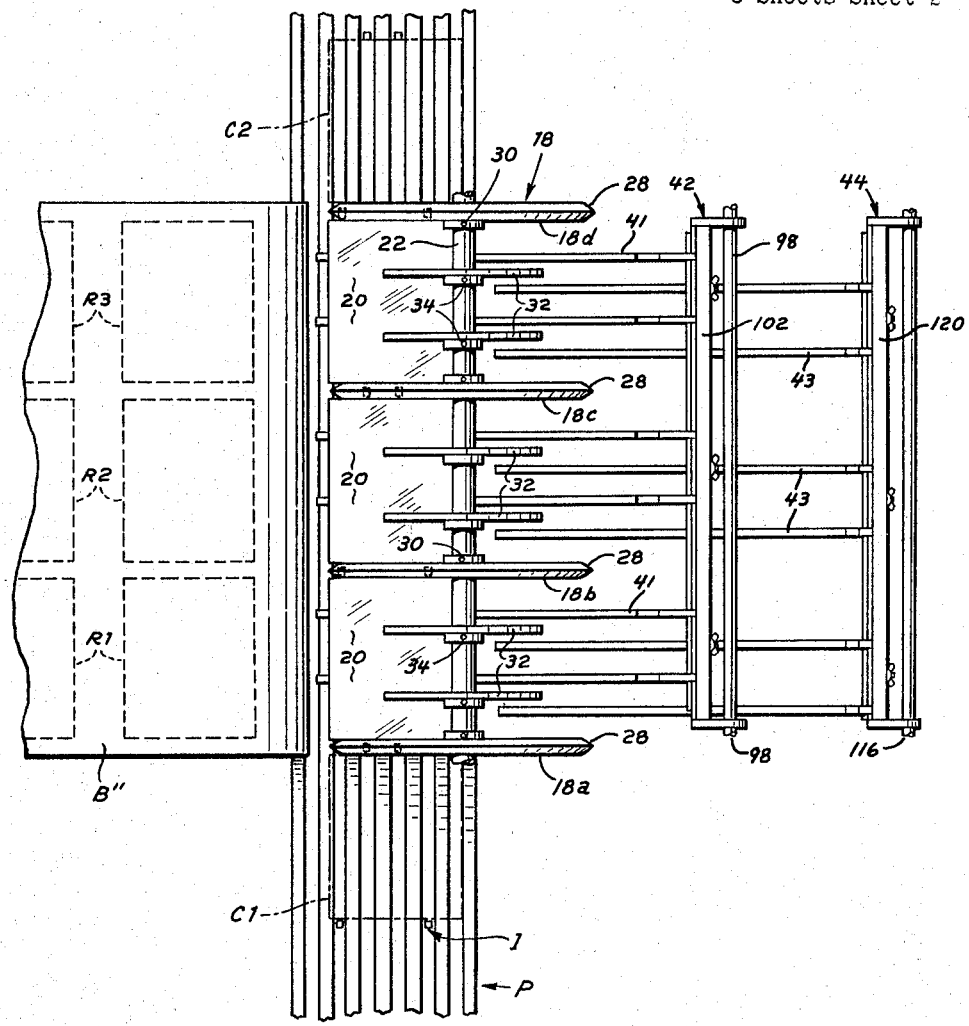
FIG. 5 is a top plan view of FIG. 3 in which there are a plurality of discs for the jogging of several rows of book pages delivered by the belt press.

The delivery system of a printing machine with which my invention is shown associated in the drawings comprises a lower belt B' and an upper belt B" co-acting to deliver sheets therebetween which are the book-page sheets to be made up into books. The book pages are delivered in a plurality of rows, three in number, as indicated at R1, R2 and R3 in FIG. 5, and there is an aligned pair of jogging discs for individually jogging the pages of each row.

The jogging discs are generally denoted at 18 and are comparatively large flat-sided circular members coaxially mounted and spaced from each other to provide intervening page-receiving jogging zones 20 (FIG. 5 only).

As shown in FIG. 5 the adjacent discs 18a, 18b, are spacedly aligned with the first row of pages R1 for the jogging thereof. The adjacent discs 18b, 18c, are spacedly aligned for the jogging of pages of the row R2, and the discs 18c, 18d are spacedly aligned for the jogging of pages of the third row R3. The belt press may be of a type shown in my Patent No. 3,026,107, in which collating of book pages is carried out and in which the collated pages are delivered in row formation to be made up into books.

As an illustration of the use of the jogger in association with the printing for press, producing printed pages for a 75-page book, for instance, delivered in three rows, the first row R1 would have a page sequence from 75 to 51, the second row R2 would have a page sequence from 50 to 26, and the third row R3 page sequence would be from 25 to 1. Now, starting at page 75 and working numerically backwards to page 51, the sheets when jogged are deposited on a platform P in an individual stack in their respective numerical sequence. An indexing device I is associated with the platform for moving the stacks therealong in step-by-step movements and is illustrated as having sets of upright fingers F freely movable between slot-forming slats S of the platform. These fingers function to simultaneously move the stacks along the platform whereby the stack originating from the first row R1 of pages when moved along the platform to the second row receives thereon a pile of pages originating from the second row R2 of the page sequence thereof, and in the next move to the third row R3 the pile of pages receives the pile of pages thereon originating from the row R3 so that the final stack contains a full set of pages for a book, which is completed when the covers are applied. In this way there is a continuous building up of sections of a book in association with book covers indicated at C1 and C2 in FIG. 5, whereby complete books are made up and sequentially delivered for the final binding operation according to known methods.

The said indexing device provides for initially placing the front cover C1 in register with the row R1 in the initial stacking of the pages for a book in this row area. The back cover C2 is placed by said indexing device on the completed stack of pages of a book as a final step in the completion of a book. It is to be understood that the indexing mechanism herein referred to does not form a part of the present invention and may be of a known type or otherwise. It is to be further understood that while my invention is described in association with a belt press wherein rows of pages are delivered for jogging in order to be made up into books, it is not limited to this specific use but is capable of other uses. Its function is essentially that of a jogging apparatus for rapid and precision jogging and can be used for the jogging of sheets of one or more rows delivered to it from a continuous and fast-moving sheet-delivery mechanism such as that of the belt press herein referred to.

My invention is of particular utility in the capacity of a jogger for jogging sheets in one or more piles wherein each pile contains a predetermined number of sheets and in which the piles are required to be displaced or shifted in a common direction, and/or in which piles of sheets are required to be placed one upon another, as in the manufacture of books automatically as the pages are received from a press.

For convenience the discs 18 are mounted upon a shaft 22 which extends transversely of the pogger frame 24 and is journalled in the side members 25, 26 thereof. The shaft is rapidly driven from a source of power by a gear connection 23 having a power take-off from the press with which it is associated. The discs are peripherally beveled as at 28 in order to guide sheets between adjacent discs and to assure that any sheets which are not fed by the delivery apparatus in a straight line will be guided into jogging area 20 between adjacent discs where the sheets are acted on by the confronting faces of the jogging discs. This assists in bringing the sheets into register with the previously jogged sheets of the pile. From the foregoing it will be clear that the discs are caused to turn rapidly in operation as sheets are delivered to them as by the delivery system of the associated press, the sheets being successively caught by their edges between the discs and carried forward and downward until their front edges strike the abutment surface provided by a stop device 40. In this way the sheets are caused to be deposited in a neat pile upon the platform P in which the sheets are precisely disposed in register one with another. The stop device 40 should have its abutment surface, denoted at 45, located in a plane containing the axis of rotation of the discs but not rearwardly thereof.

The discs are adjustable along the supporting shaft in order that they may be set to the required spacing of sheets of a predetermined width for the most effective jogging action. The space between the opposing surfaces of the discs should be the exact width of the sheets to be jogged, or minutely less than the width of the sheet, the slight difference acting to exert a slight pressure on the contacting side edges of the sheet. For convenience the discs are shown as having hub portions slidable along the shaft 22, the discs being individually secured as by set screws 30. Other means of adjustment may be used in lieu of the set screws if so desired.

The skeleton wheels, for keeping the sheets from humping up or billowing when received between an adjacent pair of discs, are disc-like members 32 having hub portions provided with set screws 34 for securing them on the shaft 22 in desired spacing. Two such wheels between a pair of discs have been found to give satisfactory results but the number may be varied or other means to this end may be substituted if so desired. Actually, a fairly good jogging effect can be secured without the wheels 32, but at certain speeds and under certain conditions the wheels 32 function to obviate humping up or billowing of the sheets as they are caught between adjacent discs and urged downwardly toward a stop member.

As an alternative to the wheels 32, fixed guides shown at 36 in FIG. 1A serve to preclude humping up or billowing of the sheets in the jogging and stacking thereof. The guide members 36 are stationary and have at their undersides an upwardly and forwardly-sloping guide surface 38 extending in the direction of adjacent ends of the belts B' and B" of the delivery system of the press. Accordingly as sheets emanate from between the belts they are supported against humping up or billowing by the guide surfaces 38 as they are carried downwardly and forwardly toward a stop device 40. For convenience the guide means is supported on the stop device 40.

The skeleton wheels 32 have an advantage over the fixed guides 36 in that they assist in forwarding the sheets against the stop 40 and holding them there.

There is a set of forks consisting of an upper fork 42 and a lower fork 44, and these forks function alternately to receive sheets which are built in piles thereon precisely jogged under the action of the discs. The upper fork 42 has spaced forwardly-projecting tines or blades 41 and the lower fork has similar tines or blades 43. The tines are received in slots 46 provided in the stop device 40 which upstands from platform P at the rear thereof. The tines of the forks are laterally offset with respect to wheels 32. The forks are separately supported on carriages and individually reciprocated between a forward position in which the tines thereof overlie the platform P and a rearward position in which they are fully withdrawn therefrom as clearly shown in FIG. 6.

The upper fork 42 is carried by the carriage generally denoted at 48 and the lower fork is carried by the carriage generally denoted at 50. The upper carriage 48 comprises side frame members 52, 53, joined together at least by one cross member 54 and supported on ways 56 for travelling to and fro thereon. Said ways are conveniently bracketed as at 58 on the frame members 25, 26 and are horizontally arranged. Anti-friction rollers 60 are used in pairs to mount the carriage on the ways.

The lower carriage 50 likewise comprises side frame members 62, 64, connected together by one or more cross members 66 and mounted on ways 68. Brackets 70 support the ways 68 on the side walls 25, 26 of the frame, and anti-friction rollers 72 mount the lower carriage on the ways 68. The carriages have relative clearance so that they may pass each other without interference in their reciprocal movements in the advancing and withdrawing of the forks in alternate cycles of operation.

Suitable means is provided to withdraw the carriages and to advance them alternately in proper time sequence. The reciprocating means comprises fluid cylinders one of which is indicated at 74 and serves to operate the upper carriage. The fluid cylinder for the lower carriage is indicated at 76. The fluid cylinders are supported on a portion of the main frame 24, indicated at 78, and each has a piston rod 80 extending therefrom and connected to a cross member of the respective carriage. The fluid line of the cylinder 74 of the upper carriage is indicated at 82 and is controlled by solenoid valve 84. The fluid line has a connection 86 with a source of fluid under pressure, as is well known in the art and the circuit for the solenoid valve, indicated at 88, extends to a strategic operating element of the press where a micro-switch is located such as that indicated at 90. The switch is closed when operated so that the upper carriage 48 will be withdrawn when the fork thereof has received the predetermined number of sheet-forming pages constituting the several sections of a book represented by the piles of sheets which have been loaded on the fork. The fork, prior to being withdrawn, has a lower movement for depositing the piles of sheets onto the platform P as will be dealt with later. The means on the strategic element of the press for operating the switch 90 for effecting withdrawal and forward motion of the carriage is not shown since it is of a known type, and the operation of a switch from a moving part of a press is well known in the art.

When the carriage 48 is retracted the electric circuit of the solenoid valve 84 is again energized for reversing this valve so that the piston rod 80 will be advanced to move the carriage 48 forwardly again to the advanced loading station of the upper fork. The carriage is advanced with the fork thereof in an uwardly tilted position as will be dealt with later.

The piston rod 80 of the other fluid cylinder 76 for the lower carriage 50 is similarly controlled by a fluid line 92 including a solenoid valve in an electric circuit with a micro-switch similar to the micro-switch 90. Switch 90 is similarly operative by a strategic active element of the press so that the lower carriage will be retracted from its advanced sheet-receiving station when piles of sheets have been built up thereon to form sections of a book of the required number of pages. Immediately prior to the retraction of the lower carriage there is a fork-lowering operation by which the piles of sheets are deposited on the platform P. The lowering of the fork in the retraction of the lower carriage will be dealt with later. The circuit of the solenoid switch for the fluid line of the cylinder 76 is similar to the circuit 88 of the solenoid switch 84 and also serves for advancing the carriage 50 after a withdrawal movement so that it again will be brought to its advanced receiving station overhead of the platform P for a recurrent loading cycle. The lower fork 44 is held in a tilted attitude while the lower carriage is being advanced to the receiving station, as will be dealt with later.

With particular reference to FIG. 6 it will be observed that the disposition of the carriages, one above the other, enables them to have reciprocal motion without interference. The forks project forwardly so that in the advanced position of each carriage the fork thereof will overlie the platform P at an elevation such that the fork will be in the proper position to receive sheets delivered by the belts of the press and jogged by the discs 18. This assures that the sheets of the several rows will be deposited on the fork in stacked formation against the stopping device 40. When each fork is in an advanced load-receiving position it is horizontally disposed for receiving sheets delivered by the belt. The upper surfaces of the forks when in horizontal load-receiving attitude occupy similar elevations, but, as has been already mentioned, the forks are advanced alternately to their load-receiving stations in a tilted position so that when the lower fork 44 is receiving a load, the upper fork 42 when stationed thereover as shown in FIG. 1, will be sloped upwardly with its outer end above the level at which the sheets are discharged by the belts, in order that the sheets as they are jogged may only be deposited onto the lower fork. Likewise, when the upper fork is in a sheet-receiving posision below the level at which the sheets are discharged from the belts, the lower fork is sloped upwardly clear of the discharging sheets as shown in FIG. 4.

When the lower fork receives a predetermined quantity of sheets and is being lowered to deposit the load on the platform P, the upper fork is then swung from its tilted position, shown in FIG. 1, to a horizontal load-receiving position, shown in FIG. 3, in order to receive delivered sheets in the process of being jogged. During this process the lower fork is being withdrawn and then advanced to again occupy an overhead tilted position for a recurrent cycle of operations. Likewise, the lower fork performs similar series of movements in its cycle of operations in which it is lowered from its tilted attitude at its load-receiving station to assume a horizontal load-receiving attitude where it receives sheets to form several stacks. It is then dropped to the platform to deposit its load thereon prior to its being withdrawn, and after complete withdrawal to its retracted position it is again advanced in tilted attitude to assume its station above the discharging sheets where it remains until the other fork receives its load.

The forks are of similar construction and each is composed of a plurality of the tines or blades which are preferably flat-sided members. The tines, 41, of the upper fork 42 have depending proximal ends 94 which depend to off-set the tines at a lower level. The tines of the lower fork 44 have offset proximal ends 96 to offset them at a higher level. Accordingly, the upper supporting surfaces of the tines have the same level in their horizontal positions.

The tines of the forks are necessarily laterally adjustable so that they may be set to required spacing to suit the spacing of the discs 18 and the intervening wheels 32. To this end the structure of the upper fork 42 comprises a transverse mounting bar 98 which extends between the side members 52, 53 of the carriage 48 and is supported thereon by means of the slide blocks 100. The transverse mounting bar carries a frontal tine bar 102 extending parallel thereto and made rigid therewith by means of the arms 104 which are keyed on or otherwise secured to the transverse mounting bar. At the front of the tine bar 102 there is a co-extensive clamping bar 106 of a flat cross-section, on which the tines 41 are fitted as by the provision of opposing notches 108 fashioned in the proximal end part 94 of the tines. The interfitting connection afforded by the notches 108 enable the tines to be slid along the clamping bar 106 to selected positions of adjustment.

The clamping bar 106 is provided with a longitudinal series of space studs 110 extending through holes in the tine bar 102 and fitted with wing nuts 112 which are tightened against the notched portions of the proximal ends of the tines to bind against the recess faces 114 of the tine bar to thereby clamp the tines securely in place. It is only necessary to slack the wing nuts in order to make lateral adjustment of the tines as may be desired from time to time. If desired, the top face of the tine bar may be graduated for selective adjustment of the tines.

The structure of the lower fork 44 is identical to that of the upper fork as above described. This comprises a transverse mounting bar 116 which is supported in the side members 62, 64, of the lower carriage 50 by means of the slide blocks 118. The tine bar is shown at 120 and the clamping bar at 122. It will, therefore, be understood that tines of the lower fork may be laterally adjusted in the manner disclosed.

It has been described that the forks are tiltable from a horizontal position to an upwardly sloping position. The fork that is uppermost at the loading station is required to be in a tilted attitude clear of the discharging sheets until it is lowered to take the place of the subjacent loaded fork. The tilting means for the forks will now be described beginning with that for the upper fork 42. This comprises a notch 124 in the periphery of each end of the transverse mounting bar 98 as shown in FIGS. 7 and 8. The transverse mounting bar 98 is a cylindrical member or at least has cylindrical end portions by which it is rotatably fitted in the slide blocks 100. Notches 124 are each located within the respective confines of the slide blocks 100 and each receives a pin 126 protruding therein. The pins thereof are of a diameter less than the width of the respective slots thereby permitting the mounting bar to have fractional rotation about its axis sufficient to enable the upper fork to be tilted from the horizontal position to an upwardly sloping position clear of discharging sheets from the press when the sheets are being loaded on the lower fork. It will be gathered that the upper fork is positively supported in its horizontal attitude by the pin and notch structure in its horizontal position and may have limited upward angular movement only as permitted by the notches 124.

A detent arrangement in each slide block serves to yieldably retain the upper fork either in its horizontal attitude or in its tilted position. The detent devices for each slide block comprises spaced indents 128 in the periphery of the end portions of the transverse mounting bar 98 and conforming in their spaced relation to the horizontal and tilted positions of the upper fork. A spring-pressed ball 130 is mounted in a hole provided in each of the slide blocks 100 to engage in the respective indent 128 when either indent is aligned with the ball. This indent arrangement is, of course, well known in the art.

Now, since the upper fork is retracted in a horizontal attitude after depositing its load on the platform it is necessary to tilt it before it is again advanced to the loading station. The tilting mechanism for accomplishing this is shown by way of example but not of limitation as comprising cam fingers 132 fixed on the extremities of the transverse mounting bar 98 beyond the slide blocks 100 and dependingly disposed so as to engage the inclined camming surfaces 134 of cam 136 in the withdrawal movement. The cam fingers 132 are pressed forwardly by the cams 136 as the carriage moves reversely and in this way the upper fork is raised to its required tilted disposition where it is yieldably held by the detent arrangement 128 and 130. The cams 136 are shown as cam plates secured by fastening elements 138 on the sidewalls 25 and 26 of the main frame 24 and inwardly thereof.

Now, with particular reference to FIG. 6 it will be seen that as the upper carriage is caused to be retracted beyond the platform P the fork 42 thereof is acted on by the engagement of the cam fingers 132 with the cams 136 with the result that the upper fork is tilted as the carriage approaches the end of its retractile movement. In the subsequent forward travel of the upper carriage, the fork thereof is maintained by said indent means in its tilted attitude at its arrival at the loading station where it is ready to be lowered to receve discharging sheets.

Figure 14:
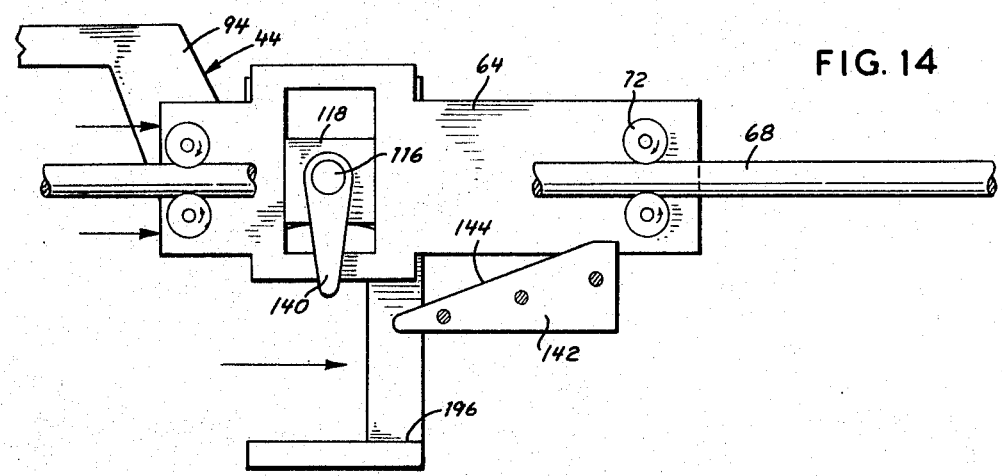
FIG. 14 is an end elevation of the lower fork at the approach to its final withdrawn position and showing the lift mechanism for raising this fork as it is fully withdrawn.
Figure 15:
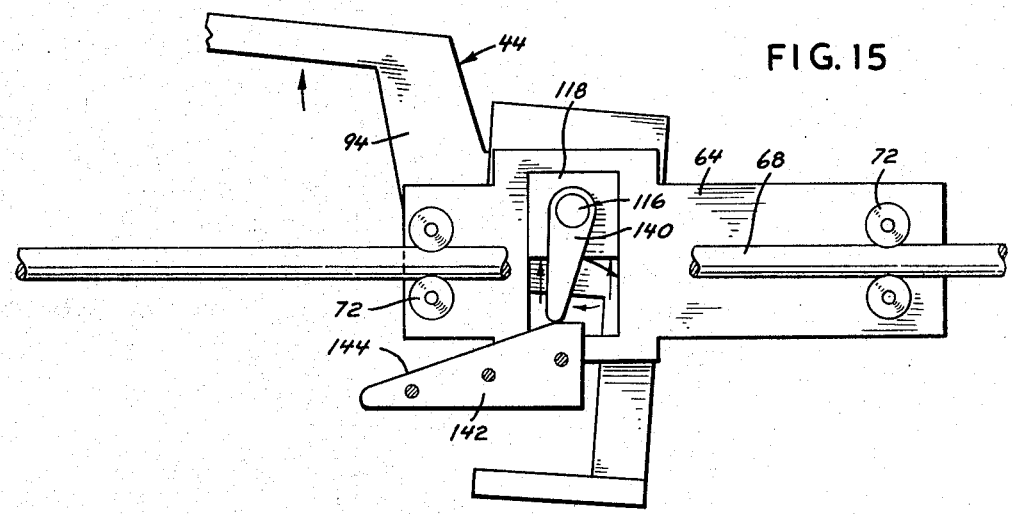
FIG. 15 is a similar view to FIG. 14 but showing how the lower fork is raised by the cam-lift mechanism as it reaches the end of its withdrawal movement.

The tilting mechanism for the lower fork is of identical construction and, therefore, it will be understood this lower fork will be held either in its horizontal position or its tilted position by the indent device thereof, and that the lower fork will be tilted by the cam mechanism as the lower carriage recedes to its fully retracted position after the lower fork deposits its load on the platform. The cam mechanism for the lower fork is shown as comprising the depending cam fingers 140 and the cam plates 142 with their inclined camming faces 144. The cam plates 142 are fastened by the elements 146 to the sidewall 25, 26, of the main frame below the lower ways 68, as detailed in FIGS. 14 and 15.

Now, from what has preceded it will be understood that each fork is capable of being bodily lowered while maintained in a horizontal attitude in order that as jogged sheets are received thereon in the elevated position of the fork and build up in stacked formation thereon, the top sheet of a stack will always be at the same level with respect to the jogging disc 18 and the discharge ends of the delivery belts of the press. It is necessary to provide for a general lowering movement on the part of each fork as it receives jogged sheets, so as to accommodate the gradual increase in thickness of the stack, and in addition thereto there must be a sudden lowering movement of the fork when the final sheet is placed on a stack composed of a predetermined number of sheets whereby the stack is lowered and deposited on the platform as the fork is withdrawn therefrom and retracted by the carriage for a recurrent operation.

To bring about the required lowering movement of the individual forks, each fork unit is bodily lowered on the carriage, and to this end its supporting blocks are mounted for vertical sliding movement in guideways of guide boxes. According to this arrangement, the supporting blocks 100 for the mounting bar 98 are slidably confined in guideways 148 of guide boxes 150 provided on the side members 52 and 53 of the upper carriage 48. This arrangement enables the upper fork to be raised and lowered bodily within the range of movement of the slide blocks 100 within the vertical guideways 148.

Now, we will first deal with the gradual lowering means for the forks whereby they are permitted to descend to accommodate the increase in thickness of a stack due to the building up of sheets on the forks. This means is best shown in FIGS. 6 and 9. In FIG. 9 the gradual lowering means is detailed with respect to the upper fork 42.

As detailed in FIG. 9 the transverse bar 98 of the upper fork is supplied near its ends with cam blocks 152 fixed thereon and provided with rearwardly-disposed camming faces 154. The camming faces are curved outwardly and upwardly from their lower ends, and are of a depth at least equal to the vertical movement of the block on which they are mounted. The camming surfaces 154 are each engaged by rollers 156 of tensioned reciprocal members 158 guidably constrained in cylinders 160 and subjected to the biasing action of helical compression springs 162. The cylinders are attached to cross-bar 54 of the upper carriage and the tension members 158 act on the cam surface 154 in a plane substantially containing the axis of the transverse mounting bar 98.

It will be apparent that constant yieldable resistance is presented against the lowering of the upper fork. This resistance is counter to any downward contactual pressure exercised by the rotating discs 18 and the skeleton wheels in their action on successive sheets received by the flanking discs in the jogging process. This arrangement constitutes tensioning devices. The yieldable resistance presented by these tensioning devices counteracts the increasing weight of sheets as the sheets are deposited on the fork in the jogging process. The springs 162 must be of the proper tension to bring about the required counter-balancing action so that the fork will gradually lower under the weight of the sheets built up in stacks thereon.

Means are provided to vary the yieldable resistance presented to the lowering of the upper fork and to this end the cam blocks 152 are mounted on the transverse bar 98 so as to turn about the same fractionally for varying the angle thereof. The cam blocks 152 are adjustably secured to fixed blocks 164 keyed or otherwise secured on the transverse bar 98. The adjustment is secured by an arcuate slot 166 provided in each cam block 152 and receiving a screw 168 by which these cam blocks are secured in adjusted position on the respective fixed blocks 164. According to this arrangement, by turning the cam blocks 152 to shift the cam faces 154 outwardly at their upper ends, a greater resistance is presented to the lowering fork and vice versa. Adjustment of the tensioning device can be made by said slot and screw arrangement to conform with different weights of paper and with variation in the number of sheets in a stack for different jobs.

The abrupt lowering of the upper fork 42 for depositing sheets upon the platform P is accomplished at the loading station. The abrupt lowering mechanism comprises a transverse shaft 170 located in a vertical plane containing the transverse mounting 98 when the upper fork 42 is disposed at the forward receiving station at which it receives jogged sheets.

Shaft 170 extends transversely above the upper carriage and is journalled in the side walls 25, 26, of the main frame as at 172 and is driven by a half-revolution clutch 174 by a power take-off from the press—see FIG. 6. The clutch has a trip device (not shown) by which it is actuated when a given number of sheets have been deposited in jogged formation on the upper fork, the trip mechanism is of a known type and therefore is not shown. The shaft 170 makes a half revolution when operated and has fixed thereon a pair of quick-drop cams 176 which are aligned with the fixed blocks 164 keyed or otherwise secured on the mounting bar 98. In making a half revolution the wiper cams 176 contact the upper faces of the fixed blocks 164 and lower the upper fork to the platform P so that the stacked sheets thereon will be deposited on the platform as the upper fork withdraws. In the inactive position of the quick-drop cams they are clear of the upper fork unit and do not interfere with its withdrawal movement, as shown in FIG. 7. When actuated the quick-drop cams 176 make contact with the lowering blocks 164, as depicted in FIG. 8.

While the means for yieldably tensioning the upper fork in order to compensate for increase of load of the jogged sheets has been recounted in detail and shown in FIG. 9, it will be understood that the tensioning means for yieldably resisting the lowering of the lower fork under the weight of jogged sheets, etc., is identical. This comprises the cam blocks 180 adjustably attached to the fixed blocks 182 (keyed on mounting bar 116) and engaged by the tensioned rollers 184 under the influence of the springs within the cylinders 186 similar to the springs 162 aforesaid.

Means for abruptly lowering the lower fork to deposit a load of jogged sheets from the fork onto the platform P is similar to that recounted for effecting abrupt lowering of the upper fork. This comprises a pair of spaced quick-drop cams 188 fixed on a transverse shaft 190 extending below the lower carriage 50 and journalled on the side walls 25, 26, of the main frame 24 as at 192. Shaft 190 is driven by a half-revolution clutch 194 (not shown) similar to the clutch 174 and likewise having a power take-off connection with the press and actuated by an automatic tripping device so that when actuated shaft 190 will make a half turn. The quick-drop cams 188 coact with respective camming surfaces 196 provided on depending extension portions 198 of the aforesaid fixed blocks 182 which are pinned or otherwise secured on the transverse bar 116.

Extension portions 198 constitute cam members. The transverse shaft 190 is clear of the carriage 50 and is forwardly disposed with respect to the depending portion of the fixed blocks 182 so that no interference is encountered in the reciprocation of the carriage 50 in its reciprocal operational movements. Shaft 190 is disposed substantially in a vertical plane containing the axis of the transverse bar 116 when this bar is in its foremost position in which the lower fork is disposed above the platform to receive jogged sheets.

From the foregoing it will be understood that as each carriage is retracted by the fluid cylinder thereof following an unloading movement of the respective fork, the fork is in a lowered position and, therefore, has to be bodily raised again. This is accomplished by the cam mechanism which tilts the fork of the respective carriage as the carriage approaches the end of its reverse movement or stroke. Now referring to this cam mechanism for the lower fork 44, this comprises the cam fingers 140 which in contacting the cam plates 142 in the reverse movement of the lower carriage not only tilt the lower fork away from its horizontal disposition, but also ride up the camming faces 144 and thus cause the blocks 118 to slide upwardly in the guideways with an attendant bodily lifting of the lower fork to its raised position so that when the lower carriage is subsequently moved forwardly the fork is disposed in raised, tilted disposition as required. A similar lifting action ensued with regard to the upper fork 42 under the action of the camming fingers 132 in making contact with the cam plates 136. Consequently, the upper fork is not only tilted away from its horizontal attitude but is bodily elevated as the supporting blocks are raised by the cam action.

It has been previously mentioned that both the upper and lower forks are required to be lowered from their tilted attitude to a horizontal attitude when at their respective sheet-receiving station in order that they may receive jogged sheets from the discs 18. Each fork must be lowered from its tilted position in timed relation to the other fork when the other fork commences its abrupt lowering movement after receiving a predetermined number of sheets for deposit on the platform P. In other words, whichever fork is uppermost in tilted attitude must be lowered at the moment the subjacent fork receives the last sheet of a pile of a predetermined quantity required to be deposited on the platform. The lowering of the tilted uppermost fork must take place quickly, and this is carried out by a quick-drop device comprising a rocker disc and brushing cam. This mechanism is similar both for the upper and lower forks. The quick-drop device for the upper fork 42 comprises two spaced rocker discs 200 which are rigidly mounted on the transverse mounting bar 98 beyond the members 164 and have aligned arcuate recesses 202 cut away on an arc of a circle, whereby to provide cam elements. Brushing cam members 204 are provided on the shaft 170 in alignment with the rocker discs 200 and rotated simultaneously with the wiper cam 176 aforesaid and spaced diametrically opposite thereto. The brushing cam members 204 are in the form of radial plates terminating in camming faces each curved on a radius whose centre coincides with the axis of the shaft 170 and dimensioned so as to be received in the arcuate cam elements 202 of the rocker discs 200 respectively. In the tilted position of the upper fork the rocker discs occupy rearwardly canted position as will be seen from an inspection of FIG. 7. When the rocker discs 200 are rotated they engage in the arcuate recesses 202 and brush against the forward end portions thereof with a lowering action sufficient to lower the upper fork to a horizontal attitude as shown in FIG. 8. Since the shaft 170 is operated by the half-turned clutch 174, one operation of this shaft serves to impart an operational movement to the quick-drop cam 176 and the other operational movement of the shaft serves to impart an operational movement to the rocker discs 200. The said quick-drop cams 176 and the brushing cam plates 204 resumes their normal inactive position after operation, which position is shown in FIG. 7.

Figure 11:
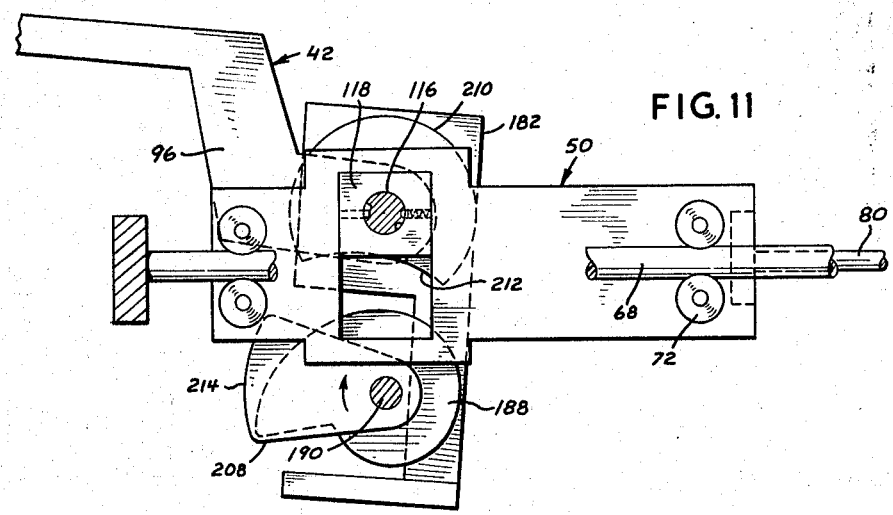
FIG. 11 is a sectional elevation of the lower fork assembly showing the cam mechanism for lowering this fork from its tilted position and for depressing the fork for depositing stacked book pages onto the platform.
Figure 12:
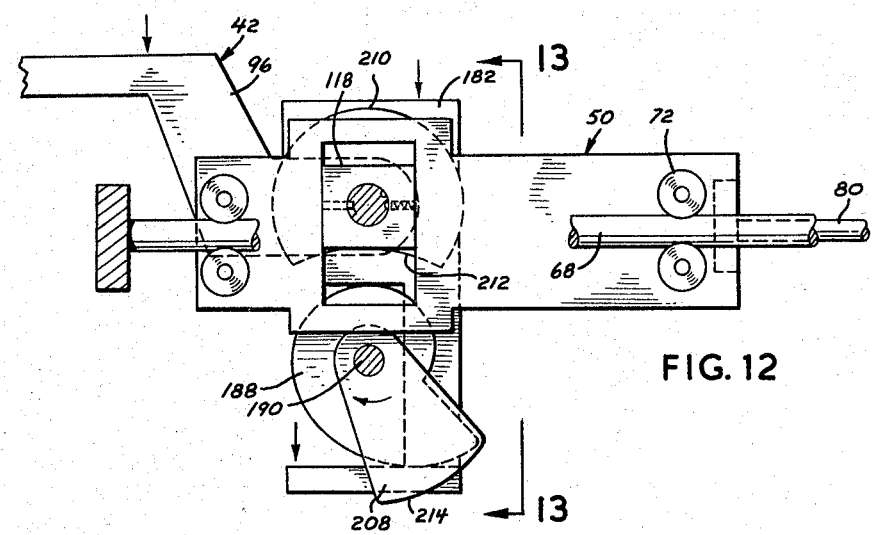
FIG. 12 is a similar view to FIG. 11 but showing the fork lowered from its tilted position and depressed to its stacked depositing position ready for retraction.
Figure 13:
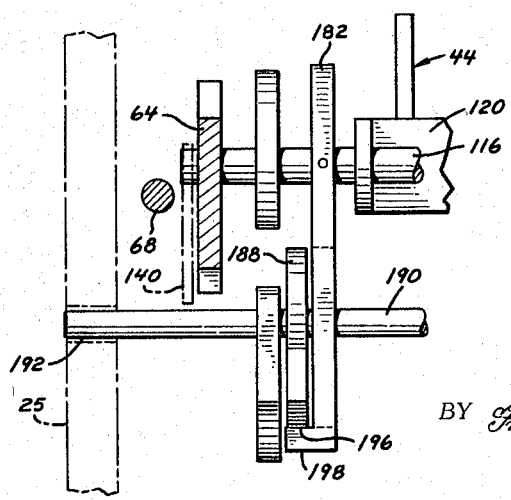
FIG. 13 is a vertical section on line 13—13 of FIG. 12 showing the cam mechanism for lowering the lower fork to a non-tilted position and for depressing the fork to deposit jogged sheets onto the receiving platform.

The lower fork 44 is similarly acted on by brushing cam plates 208 in conjunction with the lowering of this fork disc 210 in order to effect the lowering of this fork from its tilted position shown in FIG. 11 to its horizontal sheet-receiving position shown in FIG. 12. The truncated portion of the rocker disc is indicated at 212 and the periphery of the brushing cam plates is indicated at 214. The brushing cam plates are mounted on the transverse shaft 190 which is operated by the half-turn clutch referred to earlier.

From the preceding description it will be manifest that my invention presents a highly improved jogger mechanism for high speed jogging of sheets which has particular utility in the manufacture of books and the like. While the invention has been disclosed in a selected embodiment, it is to be understood that various changes and modifications may be resorted to as fairly come within the scope of the appended claims.

What I claim is:

1. In a jogging apparatus, rotary disc-like members comprising at least two such members undirectionally rotated about a common horizontal axis, said members having confronting planar surfaces spaced apart substantially the width of sheets to be jogged for receiving between them a continuity of consecutively fed sheets from a feeding source and acting to bring about a straightening effect thereof with an attendant delivery motion.

2. The jogging apparatus of claim 1, wherein said confronting planar surfaces are inner side faces of discs spaced from each other a distance not greater than the width of the sheets to be jogged, and wherein said discs are disposed relative to the feeding source such as to bring about a downward and forward delivery of straightened sheets.

3. The jogging apparatus of claim 2, wherein said discs having peripherally beveled edges.

4. In jogging apparatus according to claim 1, wherein a vertical abutment is provided in association with said disc-like members for causing said sheets to pile on a subtending support in jogged formation.

5. In jogging apparatus according to claim 2, wherein an abutment member is provided having a vertically disposed abutment surface substantially in a plane containing the axis about which said discs rotate, and wherein there is provided a support for receiving jogged sheets as they impinge said abutment surface.

6. In jogging apparatus according to claim 5, wherein said support is adapted to descend in order that the top sheet of a pile of jogged sheets will be at a constant level regardless of the quantity of sheets in the pile at any one time.

7. In an apparatus for jogging a succession of sheet-like objects, at least two rotary members unidirectionally rotatable about a horizontal axis, said rotary members having spaced apart confronting planar surfaces disposed in parallel relation and spaced relative to the width of the said objects to be jogged so as to act thereon with a straightening effect, and said rotary members being adapted to receive the said objects below the axis of rotation so as to act on said objects with a downward and forward delivery motion.

8. In jogging apparatus according to claim 7, wherein means is provided to obviate billowing of the sheets or the like as they are acted on by said motivated members.

9. In jogging apparatus according to claim 8, wherein said means for obviating billowing of the sheets comprises a device intervening said motivated members for making contact with the upper surfaces of the sheets or the like.

10. In jogging apparatus according to claim 8, wherein at least one wheel-like device is co-axially disposed between said motivated members to rotate therewith for obviating billowing of sheets or the like, and wherein said wheel-like device is smaller than said motivated members.

11. In a jogging apparatus, a horizontally disposed shaft, means for driving said shaft, at least two circular discs made fast on said shaft and having confronting inner faces, said discs being spaced apart with said inner faces set at a distance conforming to the width of sheets to be jogged for receiving between them a continuity of consecutively fed sheets from a source of supply, the peripheral edges of said discs being chamfered outwardly as a guide means for sheets, said discs being so disposed with regard to the feeding source as to bring about a downward and forward delivery of sheets with an attendant straightening action, an abutment member having a vertically disposed abutment surface substantially in a plane containing the axis of said shaft and located therebelow, said abutment surface serving as a stop for sheets, and a support below said shaft for receiving sheets as they are stopped, said support acting in conjunction with said abutment surface to stack sheets in a pile in jogged formation.

12. In jogging apparatus according to claim 11 wherein means is provided to obviate billowing of sheets as they are acted on by said discs.

13. In jogging apparatus according to claim 11, wherein said support is adopted to lower a pile of jogged sheets onto a subtending platform.

14. The jogging apparatus of claim 11, in which the discs are adjustable along said shaft for sheets of different widths.

15. In jogging apparatus, rotary members including at least two circular discs unidirectionally rotated about a common horizontal axis, said discs having confronting inner faces spaced apart at a distance conforming to the width of sheets to be jogged for receiving between them a continuity of consecutively fed sheets from a source of supply, said discs being so disposed with regard to the feeding source as to bring about a downward and forward delivery of sheets with an attendant straightening action, an abutment member having a vertically disposed abutment surface substantially in a vertical plane which serves as a stop for sheets, a platform spaced below said discs, a fork mechanism comprising an intervening elevated fork arranged transversely over said platform for receiving sheets as they come to rest against said abutment surface in a jogged pile, said fork mechanism including means for lowering said fork to deposit the pile of jogged sheets onto said platform and to restore said fork to an intervening elevated disposition for recurrent operation.

16. The jogging apparatus of claim 15, in which there are a plurality of discs mounted upon a driven shaft in spaced relation in adjacent pairs, adjacent discs of each pair having confronting faces spaced apart at a distance conforming to the width of sheets of a row of consecutively fed sheets from a source of supply, the arrangement being such that a pile of jogged sheets is built up from each row of consecutively fed sheets; and in which a fork is provided for depositing each pile of jogged sheets onto said platform.

17. The jogging apparatus of claim 15, wherein means are associated with said platform to move a pile of jogged sheets therealong so that another pile thereof may be deposited in its place.

18. The jogging apparatus of claim 15, wherein upstanding fingers project from slots in said platform to shift a pile of jogged sheets therealong so that another pile thereof may be deposited in its place.

19. The jogging apparatus of claim 15, in which the fork mechanism includes means for permitting the fork to gradually descend in order that the top sheet of a jogged pile will be at a constant level regardless of the quantity of sheets in the pile as it is built up to a predetermined number of sheets for deposit on the platform.

20. The jogging apparatus of claim 19, in which the fork is horizontally carried on a support in which it bodily moves vertically, and in said fork is held by tension at an elevation from which it may descend according to the load of sheets thereon at any one time.

21. The jogging apparatus of claim 20, in which the fork is tensioned by a spring device.

22. The jogging apparatus of claim 20, in which the fork is vertically movable by means of slide blocks, and in which cam blocks are made rigid with said slide blocks and have outwardly and upwardly curved camming faces engaged by spring-loaded rollers in order to permit the fork to descend according to the load of sheets on the fork in the building of a pile of jogged sheets thereon.

23. Jogging apparatus as in claim 15, in which there is an upper fork and a lower fork alternately operable to receive sheets and to deposit them in jogged piles onto said platform, and in which each fork is supported upon a carriage and has a limited upward tilting action from a horizontal sheet-receiving position so that while one fork is being loaded the other fork may be tilted to an overhead attitude clear of sheets being delivered to the discs from the source of supply.

24. Jogging apparatus as in claim 23, in which a transverse mounting bar mounts each fork on its carriage, each said fork being rigid with the mounting bar, and there being means provided to allow the mounting bar to turn fractionally for limited upward tilting action of the fork thereon from a horizontally sheet-receiving position.

25. Jogging apparatus as in claim 24, in which each transverse mounting bar is journalled in slide blocks guidably constrained for vertical movements, and in which pins project from the slide blocks of the respective carriage and are received in notches provided in the transverse mounting bar thereof to allow the bar to turn fractionally.

26. The jogging apparatus of claim 15, in which the lowering means for the fork comprises an abrupt lowering device mounted upon a carriage for withdrawing from the platform for placing the pile of jogged sheets on the platform as it reaches a fully lowered position.

27. The jogging apparatus of claim 26, in which said carriage is reciprocally mounted upon a main frame, and in which said lowering device automatically lowers the fork when a predetermined number of sheets are received thereon.

28. The jogging apparatus of claim 26, in which said carriage is reciprocally mounted upon a main frame, and in which said carriage is automatically retracted to withdraw said fork from the platform.

29. The jogging apparatus of claim 27, in which said carriage is reciprocally mounted upon a main frame and automatically operated in regard to retractile and forward movements, and in which the fork is supported on the carriage to be lowered bodily and restored to raised position in timed sequence, the lowering of the fork being achieved by a quick-drop cam mechanism.

30. The jogging apparatus of claim 29, wherein the quick-drop cam mechanism comprises a mounting bar rigid with the fork and supported on the carriage for limited lowering and raising movements along with the fork, a cam shaft journalled in said main frame and disposed overhead of said mounting bar when the carriage is in its forward position with the fork disposed over the platform, means for sequentially operating said cam shaft, and quick-drop cams on said cam shaft for engaging fixed blocks on said mounting bar with an abrupt lowering action.

31. The jogging apparatus of claim 15, wherein said fork mechanism comprises a carriage reciprocally mounted upon a main frame and automatically operated with regard to retractile and forward movements, slide blocks on said carriage and guidably confined for vertical movements, a transverse mounting bar journalled in said slide blocks and supporting the fork, means constraining said mounting bar so that the fork may only turn fractionally between a horizontal sheet-receiving position and an upward tilting position in which it is clear of sheets delivered to the discs from the source of supply, means for yieldably retaining said fork in either of said positions, and means for automatically turning the fork to its tilted position during retraction of the carriage.

32. The jogging apparatus of claim 31, wherein a cam device functions to effect automatic turning of the fork to its tilted position.

33. The jogging apparatus of claim 31, wherein the means for automatically turning the fork to its tilted position comprises a depending cam finger on the mounting bar and disposed to engage a cam plate in its path in the retraction of the carriage, said cam plate supported on the main frame.

34. The jogging apparatus of claim 15, wherein said fork mechanism comprises a carriage reciprocally mounted upon a main frame and automatically operated with regard to retractile and forward movements, slide blocks on said carriage and guidably confined for vertical movements, a transverse mounting bar journalled in said slide blocks and supporting the fork, means constraining said mounting bar so that the fork may only turn fractionally between a horizontal sheet-receiving position and an upward tilting position in which it is clear of sheets delivered to the discs from the source of supply, means for yieldably retaining said fork in either of said positions, and means for automatically turning the fork to its tilted position and raising the slide blocks to elevate the fork bodily to restored position during retraction of the carriage.

35. The jogging apparatus of claim 34, wherein cam mechanism is employed for automatically turning the fork to its tilted position and raising the slide blocks to elevate the fork bodily to restored position.

36. The jogging apparatus of claim 15, in which the fork comprises tines for extending between said discs.

37. The jogging apparatus of claim 36, in which the tines are adjustable to and away from each other by a clamp structure including a tine bar and a clamping bar held together by fasteners to secure the tines.

References Cited by the Examiner

UNITED STATES PATENTS

| | | | |
|---|---|---|---|
| 360,439 | 4/1887 | Holbrook | 271—89 |
| 868,618 | 10/1907 | Tucker | 271—89 |
| 1,448,301 | 3/1923 | Hotchkiss | 271—89 |
| 1,958,133 | 5/1934 | Delany | 271—89 |
| 2,000,273 | 5/1935 | Conklin et al. | 271—68 |
| 2,158,817 | 5/1939 | Doetzel | 271—71 |
| 2,258,461 | 10/1941 | Marsden et al. | 198—35 |
| 2,732,206 | 1/1956 | Dietrich | 271—89 |
| 3,022,999 | 2/1962 | Mead | 271—89 |
| 3,026,107 | 3/1962 | Stroud | 270—58 |
| 3,044,772 | 7/1962 | Trenner | 271—68 |
| 3,083,014 | 3/1963 | Howdle et al. | 221—89 |

ROBERT B. REEVES, *Primary Examiner.*

WALTER SOBIN, *Examiner.*